(12) United States Patent
Menheere et al.

(10) Patent No.: US 11,623,756 B2
(45) Date of Patent: Apr. 11, 2023

(54) GAS TURBINE ENGINE WITH VARIABLE SPEED OUTPUT

(71) Applicant: PRATT & WHITNEY CANADA CORP., Longueuil (CA)

(72) Inventors: David Menheere, Norval (CA); Santo Chiappetta, Georgetown (CA); Timothy Redford, Campbellville (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 408 days.

(21) Appl. No.: 16/784,591

(22) Filed: Feb. 7, 2020

(65) Prior Publication Data

US 2021/0276724 A1 Sep. 9, 2021

Related U.S. Application Data

(60) Provisional application No. 62/951,548, filed on Dec. 20, 2019.

(51) Int. Cl.
| | | |
|---|---|---|
| B64D 31/00 | (2006.01) | |
| B64C 29/00 | (2006.01) | |
| B64D 27/10 | (2006.01) | |

(52) U.S. Cl.
CPC .......... *B64D 31/00* (2013.01); *B64C 29/0041* (2013.01); *B64D 27/10* (2013.01)

(58) Field of Classification Search
CPC .... F02C 3/113; F02C 7/36; F02C 9/20; F01D 17/16; B64D 31/00; B64D 27/10; B64C 29/0041
See application file for complete search history.

(56) References Cited

U.S. PATENT DOCUMENTS

| | | | |
|---|---|---|---|
| 4,251,987 A | * | 2/1981 | Adamson ................ F02C 3/113 60/226.1 |
| 7,487,630 B2 | | 2/2009 | Weiler |
| | | | (Continued) |

FOREIGN PATENT DOCUMENTS

EP 0087302 2/1983

OTHER PUBLICATIONS

European Search report dated May 19, 2021 issued for Application No. 20215796.2.

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

The gas turbine engine for an aircraft includes at least a low pressure spool with a low pressure turbine shaft operatively connected to at least one turbine, the low pressure turbine shaft rotatable about an engine axis, and a low pressure compressor operatively connected to a low pressure compressor shaft that is independently rotatable relative to the low pressure turbine shaft. A differential gearbox has an input operatively connected to the low pressure turbine shaft, a first output and a second output, the first output of the differential gearbox operatively connected to the low pressure compressor shaft and the second output of the differential gearbox operatively connected to an output shaft of the gas turbine engine. The differential gearbox permits the output shaft, the low pressure compressor shaft and the low pressure turbine shaft to rotate at different speeds.

17 Claims, 4 Drawing Sheets

(56) References Cited

U.S. PATENT DOCUMENTS

| | | |
|---|---|---|
| 10,094,295 B2 | 10/2018 | Ullyott et al. |
| 10,119,475 B2 | 11/2018 | Roberge |
| 2007/0205321 A1 | 9/2007 | Waide |
| 2010/0164234 A1* | 7/2010 | Bowman .................... F02C 9/22 60/785 |
| 2013/0227954 A1* | 9/2013 | Marini ...................... F02C 9/20 60/773 |
| 2013/0259652 A1* | 10/2013 | Kupratis .................... F02C 7/36 415/122.1 |
| 2014/0260295 A1 | 9/2014 | Ullyott et al. |
| 2018/0209350 A1* | 7/2018 | Kupratis ................. F02C 3/113 |
| 2020/0182162 A1* | 6/2020 | Burge ..................... F02C 7/141 |

* cited by examiner

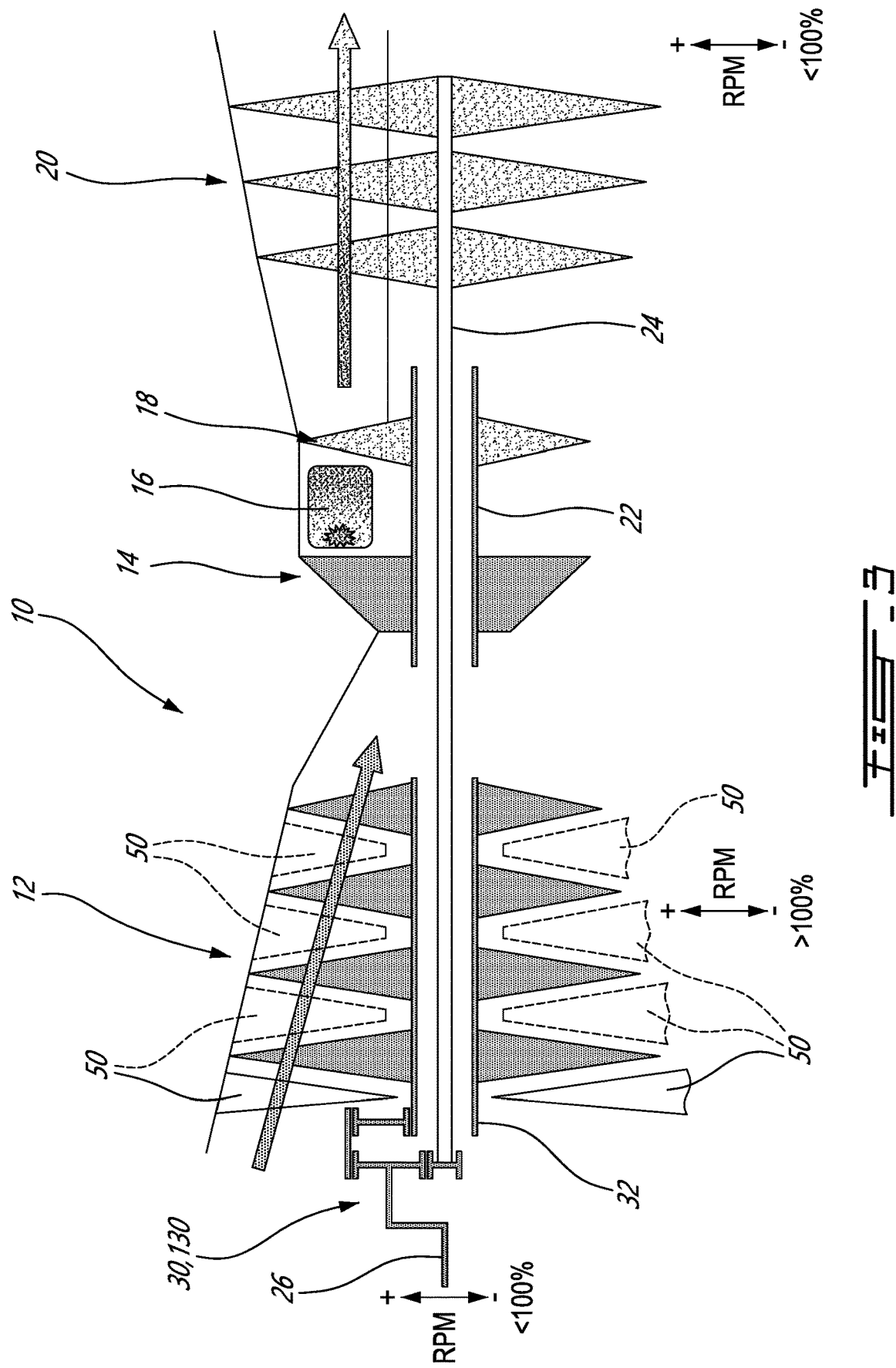

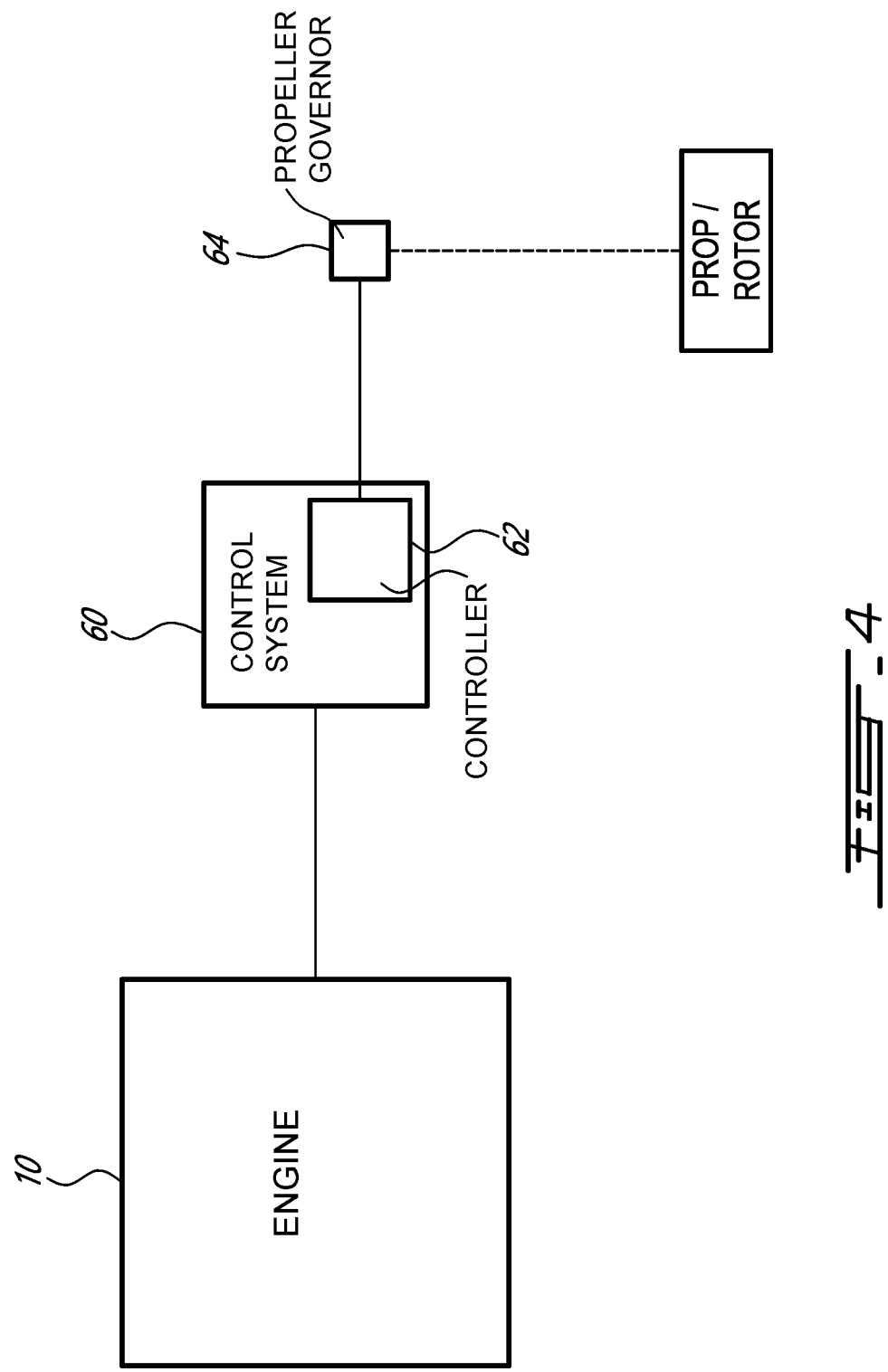

GAS TURBINE ENGINE WITH VARIABLE SPEED OUTPUT

CROSS-REFERENCE

The present application claims priority on U.S. Patent Application No. 62/951,548 filed Dec. 20, 2019, the entire contents of which are incorporated herein by reference.

TECHNICAL FIELD

The disclosure relates generally to gas turbine engines and, more particularly, to turboshafts and turboprops which drive aircraft rotors.

BACKGROUND

For certain types of aircraft, including but not limited to Vertical Takeoff and Landing (VTOL) aircrafts, having aircraft rotors or propellers and/or for certain gas turbine engines, one obstacle to achieving good propulsive efficiency during cruise phases of flight is the losses due to the high helical tip Mach No. of the aircraft rotor. Reducing rotor tip speeds can improve cruise efficiency and reduce rotor induced noise. However, high rotor tip speed is nevertheless desired in certain flight conditions, such as when more power is required, because rotor lift is proportional to the square of tip speed.

SUMMARY

There is accordingly provided a gas turbine engine for an aircraft, the gas turbine engine comprising: a low pressure spool including a low pressure turbine shaft operatively connected to at least one turbine, the low pressure turbine shaft rotatable about an engine axis; a high pressure spool including at least one high pressure turbine and at least one high pressure compressor operatively connected together by a high pressure shaft and rotatable about the engine axis, the high pressure shaft being independently rotatable relative to the low pressure turbine shaft; a low pressure compressor operatively connected to a low pressure compressor shaft that is independently rotatable relative to the high pressure shaft and the low pressure turbine shaft; and a differential gearbox having an input operatively connected to the low pressure turbine shaft, a first output and a second output, the first output of the differential gearbox operatively connected to the low pressure compressor shaft and the second output of the differential gearbox operatively connected to an output shaft of the gas turbine engine, the differential gearbox permitting the output shaft, the low pressure compressor shaft and the low pressure turbine shaft to rotate at different speeds.

There is also provided a method of operating a vertical takeoff and landing (VTOL) aircraft having an aircraft rotor operatively connected to a gas turbine engine that includes a low pressure compressor, a high pressure compressor, a high pressure turbine and a low pressure turbine, the method comprising: during a VTOL flight phase of the aircraft, driving the aircraft rotor at a high-power rotational speed, with the low pressure turbine rotating at a first rotational speed and the low pressure compressor rotating at a second rotational speed; and during a cruise flight phase of the aircraft, driving the aircraft rotor at a low-power rotational speed that is less than the high-power rotational speed by increasing the first rotational speed and decreasing the second rotational speed.

There is further provided a gas turbine engine for a vertical takeoff and landing (VTOL) aircraft having an aircraft rotor, the gas turbine engine comprising: a low pressure turbine shaft connected to at least one turbine for driving the low pressure turbine shaft about an engine axis, and a low pressure compressor operatively connected to a low pressure compressor shaft independently rotatable relative to the low pressure the power turbine shaft; and means for operating the gas turbine engine in either a VTOL engine operating configuration or a cruise engine operating configuration, wherein in the VTOL engine operating configuration the low pressure turbine and the low pressure compressor are operated at their respective nominal design speed for takeoff, and in the cruise engine operating configuration, the low pressure turbine is allowed to rotate between 80% and 100% of its nominal design speed for takeoff and the low pressure compressor is driven to rotate at between 80% and 150% of its nominal design speed for takeoff.

BRIEF DESCRIPTION OF THE DRAWINGS

Reference is now made to the accompanying figures in which:

FIG. 3 is a schematic cross sectional view of an exemplary gas turbine engine, such as that of FIG. 1, shown in a cruise engine operating configuration; and FIG. 4 is a schematic diagram of the gas turbine engine of FIG. 1 and an engine control system operably connected thereto.

DETAILED DESCRIPTION

Figure 1:
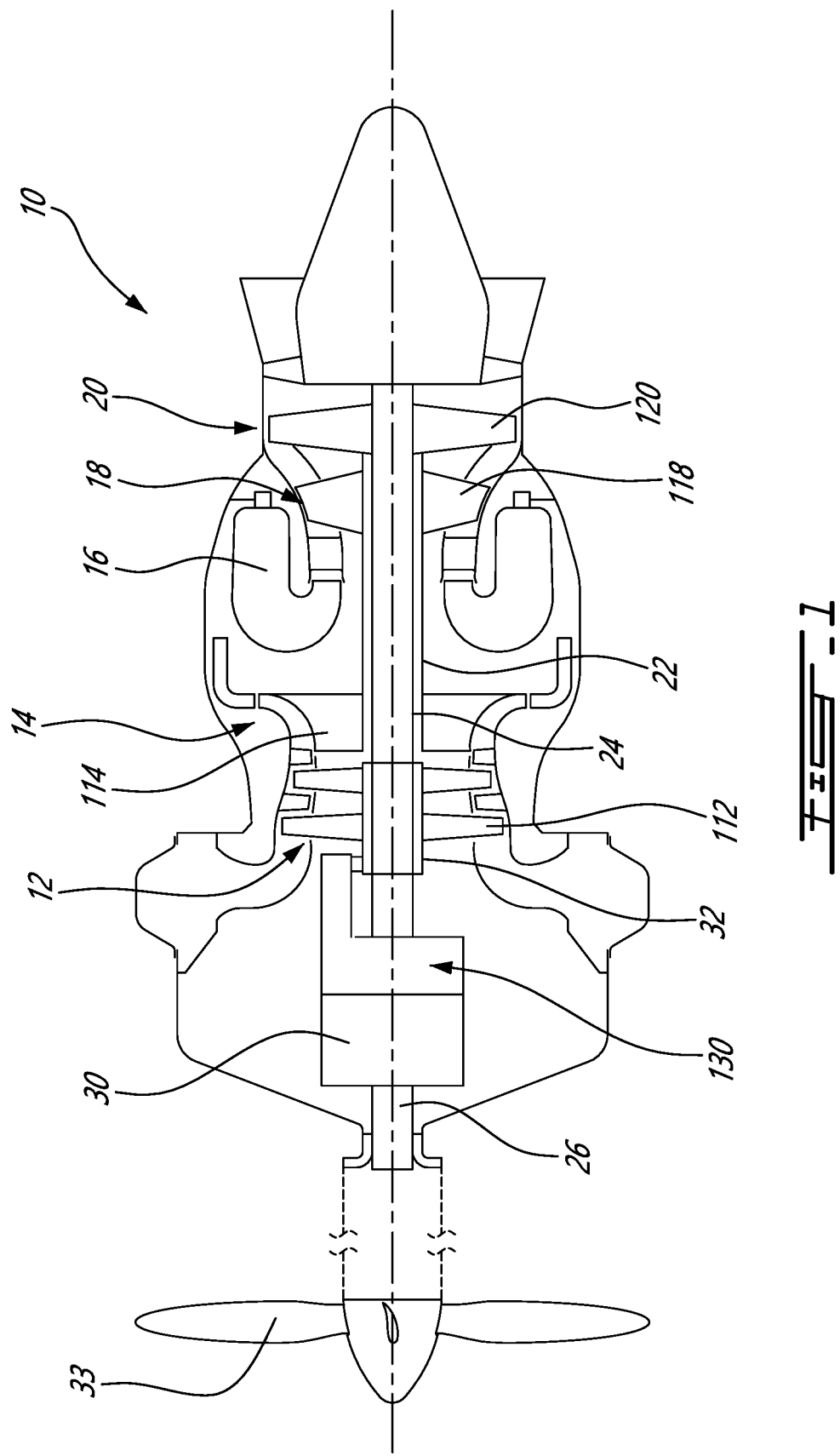
FIG. 1 is a schematic cross-sectional view of a gas turbine engine suitable for use in an aircraft having an aircraft rotor.

In typical multi-spool gas turbine engines, the low pressure turbine (sometimes called the power turbine in the case of turboprop and turboshaft engines) is connected to the same engine shaft (i.e. the low pressure shaft) as the low pressure compressor, such that the exhaust gas flow of the engine core which drives the low pressure turbine causes the low pressure compressor to rotate at the same speed. With particular reference to gas turbine engines used in vertical takeoff and landing (VTOL) aircraft, power demands on such engines vary during flight, for example between takeoff and cruise flight configuration. The turbine and compressor rotors of these engines typically have to rotate at a relatively large range of rotational speeds in order for the low pressure turbine rotor(s), and thus the low pressure compressor rotor(s) and the aircraft rotor, propeller or output shaft driven thereby, to have the required rotational speed. In certain conditions, low power requirements may require the rotors of the core section to rotate below their optimal rotational speed, which may limit the engine's efficiency in certain conditions.

These challenges are particularly pertinent in the context of gas turbine engines used in a vertical takeoff and landing (VTOL) aircraft, or so-called "tilt-rotor" aircraft, given that the power requirements on the engine(s) are different for VTOL flight conditions than they are for cruise flight conditions.

While the gas turbine engine will be generally described hereinbelow in the context of its use in a VTOL aircraft, it is to be understood that the gas turbine engine described herein may also be used in other types of aircraft, both planes and helicopters, which have aircraft rotor(s) used to propel the aircraft. Such aircraft rotors as defined herein my include both propellers and helicopter rotors. As such, the gas turbine engine as described herein may be used as a turboprop or turboshaft engine for a horizontal flight aircraft, a helicopter, and/or a VTOL aircraft.

Developing an efficient gas turbine engine for certain types of aircraft, including but not limited to VTOL aircraft, not only requires the components be efficient at their design points (typically the takeoff or Cruise conditions for aircraft engines) but also at off-design conditions. One obstacle to achieving good propulsive efficiency in cruise is the losses due to the high helical tip Mach No. of the aircraft rotor. Reducing rotor tip speeds to levels below typical rotorcraft hover values can improve cruise and reduce rotor induced noise. However, high rotor tip speed may be desired in some flight conditions, such as when high power demands are required (which may include hover or VTOL conditions for VTOL aircraft), because rotor lift is proportional to the square of tip speed. Designing an engine to meet these conflicting requirements represents a challenge for the various components running in off design conditions. The Low Pressure or Power Turbine (LPT) is designed to run most efficiently at a rotational speed of 80-100% of its nominal design speed for takeoff (which, it is to be understood, may not be the true maximum safe rotational speed). In most existing turboprop, turboshaft and/or tilt-rotor designs, the LPT is directly coupled to the Reduction Gearbox (RGB), however less than ideal efficiency results when the rotational speed of the LPT drops below 80%.

The gas turbine engine and method of operating same as defined in further detail hereinbelow, accordingly seeks, among other things, to address such a potential speed variance. Accordingly, the gas turbine engine as defined herein may permit, during cruise flight conditions, a greater rotational speed reduction of the aircraft rotor than of the low pressure (or power) turbine. This may allow for greater forward flight speed and/or improved engine efficiency during cruise conditions, while keeping the low pressure/power turbine closer to its design point. An overall more efficient operating range and/or flight speed during cruise flight segments may therefore be possible for VTOL aircraft, without sacrificing performance during VTOL or hover flight conditions.

The engine 10 schematically illustrated in FIG. 1 is configured for use, in one particular embodiment, in a VTOL aircraft (such as, but not limited to, a tilt-rotor aircraft). However, as noted above, it is to be understood that the engine 10 as described herein may also be a turboshaft or turboprop engine used in a another type of aircraft (e.g. a helicopter or a plane).

Referring in more detail to FIG. 1, the gas turbine engine 10 generally comprises in serial flow communication a low pressure compressor section 12 and a high pressure compressor section 14 for pressurizing the air, a combustor 16 in which the compressed air is mixed with fuel and ignited for generating an annular stream of hot combustion gases, a high pressure turbine section 18 for extracting energy from the combustion gases and driving the high pressure compressor section 14, and a low pressure turbine section 20 for further extracting energy from the combustion gases.

The engine 10 includes a high pressure shaft 22 interconnecting the rotors of the high pressure turbine section 18 and the high pressure compressor section 14, and a low pressure or power shaft 24. In a particular embodiment, the high pressure shaft 22 is hollow and the low pressure shaft 24 is concentric therewith and extends therethrough. The two shafts 22, 24 are free to rotate independently from one another.

The high pressure compressor section 14 includes at least one high pressure compressor rotor 114, which in the exemplary embodiment includes a centrifugal compressor having an impeller, that is drivingly engaged to the high pressure shaft 22. The high pressure turbine section 18 includes at least one turbine rotor 118 also drivingly engaged to the high pressure shaft 22. The high pressure compressor and turbine rotors 114, 118 are therefore directly engaged to the high pressure shaft 22, so that they rotate at a same speed. The low pressure turbine 20 includes at least one low pressure turbine rotor 120.

The low pressure compressor (LPC) section 12 includes at least one low pressure compressor rotor 112 (two rotors are depicted in the exemplary embodiment of FIG. 1) which are not connected directly to the low pressure shaft 24, but rather operatively connected to a transmission shaft 32 (also referred to herein as a low pressure compressor shaft 32) that is independently rotatable relative to both the low pressure shaft 24 and the high pressure shaft 22. The transmission shaft 32 permits the rotors 112 of the LPC section 12 to rotate at a speed that is different from that of the turbine rotors 120 of the low pressure turbine section 20. In one particular embodiment, the transmission shaft 32 is hollow and concentric with the low pressure shaft 24, with the low pressure shaft 24 extending through the transmission shaft 32.

The low pressure turbine section 20 rotates the low pressure shaft (or "power" shaft) 24, which drives both a reduction gearbox (RGB) 30 and the LPC section 12, via a differential gearbox 130 as will be described in further detail below. The RGB 30 reduces speed and increases torque to a single output, namely the engine output shaft 26, to drive the aircraft's propeller/rotor at a suitable speed. The differential gearbox 130 however splits the torque input it receives (in this case, from the low pressure shaft 24), into two separate outputs—namely to the LPC 12 and the RGB 30/engine output shaft 26.

The differential gearbox (or simply "differential") 130 provides a differential drive between the transmission shaft 32 of the LPC 12, to which the rotor(s) 112 are operatively connected, and the RGB 30. The differential 130 splits the power input received therein from the low pressure turbine 20, via the low pressure shaft 24, between a first output: i) the LPC 12; and a second output ii) the RGB 30. The RGB 30 provides power output to the engine's output shaft 26. As such, the first output of the differential 130 is operatively connected to the low pressure compressor shaft 32 and the second output of the differential 130 is operatively connected to the output shaft 26 of the engine, albeit indirectly via the RGB 30 located therebetween. The term "operatively connected" as used herein is understood to mean, when used in the mechanical engagement context, connected or coupled in such a manner that one element may drive or be driven by another, whether this be directly (e.g. the two parts are fastened together for common rotation or the two parts are in direct gear-meshed engagement for relative rotation therebetween) or indirectly (e.g. one element ultimately drives or is driven by another element, even if another component—such as the RGB 30 in the example above—is disposed therebetween and interconnects the two elements). The term operatively connected may also include an electrical, fluid or other interconnection between components, for example in the case of an engine control system that is operatively connected to the mechanical components of the engine that is controls.

In one particular embodiment, the RGB 30 and the differential gearbox 130 may be separate gearboxes operatively connected together such that the output of the differential gearbox drives the input of the RGB. However, in another possible embodiment, the RGB 30 and the differential 130 are integrated together to form a common gearbox assembly comprising the necessarily gearing of each and performing the functions of each within a common gearbox assembly. The RGB 30 and differential 130 may collectively comprise a variable transmission of the engine 10.

By adding the differential 130 between the LPC 12 and the RGB 30, the input power from the low pressure turbine 20 is split between the LPC 12 and the RGB 30, such that the LPC 12, the low pressure turbine 20, and the output shaft 26 of the engine can all be controlled to rotate at different speeds, as may be desired in order to better accommodate different flight conditions while maintaining desired levels of efficiency during each flight condition.

The differential 130 allows, for example, a variation of the rotational speed of the low pressure compressor rotor(s) 112 and/or of the engine output shaft 26, independently of the speed of the turbine sections 18, 20, e.g. while keeping the rotational speed of the turbine section 20 substantially constant or constant (the differential is not connected to the high pressure turbine section 18). The differential 130 may thus be controlled to vary a speed ratio between the rotational speeds of the low pressure shaft 24, the transmission shaft 32, and the RGB 30—and thus the engine output shaft 26.

As noted above, designing a gas turbine engine to meet the sometimes conflicting requirements required for engines operating at design and off-design points (particularly in the context of a VTOL aircraft) represents a challenge for the various components running in off design conditions. In typical gas turbine engines, the Low Power Turbine (LPT) is designed to run efficiently at 80-100% rotational speed. Since in a traditional turboprop engine, the LPT is directly coupled to the Reduction Gearbox (RGB), less than ideal efficiency results when the speed is dropped below 80%.

The differential 130 of the present gas turbine engine 10 however permits the engine's output shaft 26, and thus the propeller or aircraft rotor 33 operatively connected thereto, to be operated at different rotational speeds depending on the demands of the aircraft and/or the flight conditions thereof, while still maintaining rotation of the low pressure turbine 20 within an efficient operating range. This is done, as will be seen from the example below, by permitting the LPC 12 to rotate at relatively higher rotational speeds (e.g. between 80 and 150%, or alternately between 100 and 140% of its respective nominal full-power takeoff speed).

The differential 130 of the engine 10, which may be particularly suited for VTOL aircraft, accordingly couples the LPT 20 with the LPC 12 and the engine's output shaft 26, such as to allow a greater rotational speed reduction of the engine output shaft 26 (and thus the aircraft's rotor) than of the LPT 20 in certain desired flight conditions when less power is needed, such as cruise conditions for example.

Greater forward flight speed and/or improved operating range of a VTOL aircraft during cruise flight configurations may therefore be possible, by coupling the LPT 20 of the engine 10 with the LPC 12 and the engine's output shaft 26 (and thus the aircraft rotor 33 coupled thereto) using the differential 130, to thereby permit a greater rotational speed reduction of the output shaft 26 (and thus the aircraft rotor 33 coupled thereto) during a cruise flight configuration, relative to a full power VTOL flight configuration, than of the LPT 20. This accordingly permits the LPT 20 to operation within a more desirable rotational speed range, e.g. 80-100%, during cruise flight configurations, while still permitting the rotational speed of the engine's output shaft 26 (and thus the aircraft rotor 33 coupled thereto) to be reduced significantly (e.g. between 25% and 100%) relative to its full power VTOL configuration rotational speed.

Figure 2:
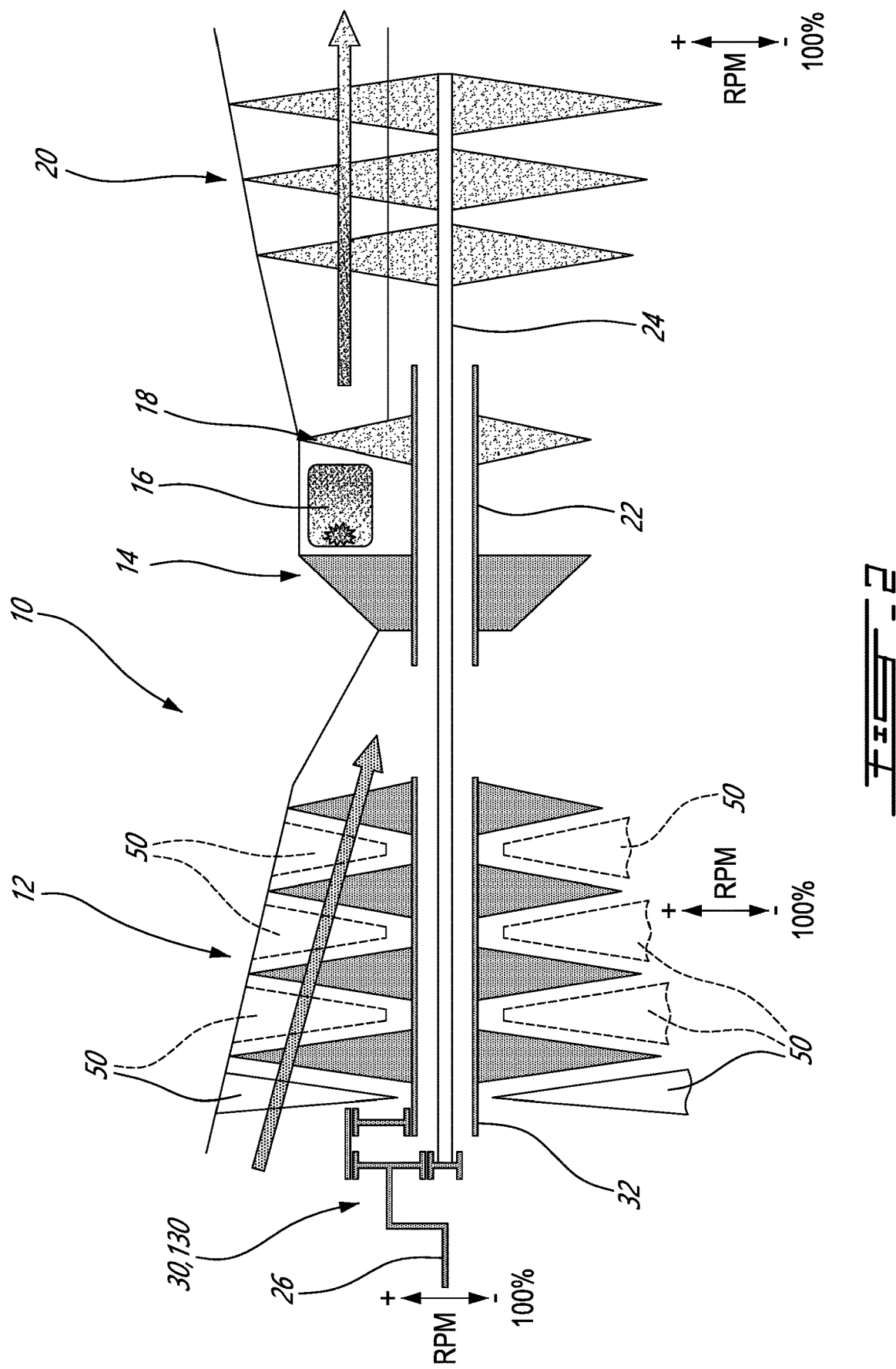
FIG. 2 is a schematic cross sectional view of an exemplary gas turbine engine, such as that of FIG. 1, shown in a VTOL engine operating configuration.

Referring now to FIG. 2 and FIG. 3, which respectively show the engine 10 in a VTOL configuration (FIG. 2) and a cruise configuration (FIG. 3), in one particular embodiment the LPC 12 of the engine 10 includes at least one set of inlet guide vanes (IGV) 50. In the depicted embodiment of FIGS. 2 and 3, one set of IGVs 50 is provided for each of the rotors 112 of the LPC 12, such that each of stages of the LPC 12 includes a set of IGV 50. However, in an alternate embodiment, not every stage (and thus not every rotor) of the LPC 12 has a set of IGVs 50. In this embodiment, therefore, there are more compressor rotors than sets of IGVs 50 in the LPC 12. For example, a single set of IGVs may be provided for all of the rotors of the LPC 12. The LPC 12 may therefore include two or more sages, each having a compressor rotor, and wherein at least one (but not necessarily all) of the two or more stages has a set of the IGVs 50. As such, the number of rotors/stages within the LPC 12 may therefore be greater than the number of sets of IGVs 50.

The IGVs 50 are understood to be variable, in that they can be moved such as to modify the incidence angle of air for each stage of the compressor. In at least one embodiment, the variable inlet guide vanes 50 of each of the compressor stages of the LPC are independently controllable. By "independently controllable" as used herein, this means for example that a first set of IGVs 50 may be displaced into a first position by executing a first control sequence, and a second set of IGVs 50 may be displaced into a second, different, position by executing a second control sequence different from the first. As such, the vanes of each set of IGVs can be positioned at a desired orientation for each stage of the LPC 12 such that a different incidence angle can be selected for each of the compressor rotors, if so desired. In other words, the IGVs 50 of the LPC 12 need not all be opened or closed by the same amount, but each may be individually controlled to open or closed a desired amount, as may be required. By providing the IGVs 50 between the stages of the LPC 12, which rotate on the transmission shaft 32 independently of the low pressure shaft 24 and the high pressure shaft 22, the rotational speed of the LPC 12 can be controlled.

However, in another embodiment of the engine 10, the LPC 12 does not include any variable IGVs, and instead uses an alternate (e.g. pneumatic operated) means to reduce aerodynamic load on the LPC. This configuration may include, for example only, bleed valves which are located between the stages of the LPC 12 and which are operated to achieve a similar result as the variable IGVs 50, in a manner that will be appreciated by one skilled in the art.

Referring still to the embodiment of FIGS. 2 and 3, the IGVs 50 are operated and controlled, by an engine control system 60 (see FIG. 4) of the engine 10, in order to control the incident angle of the air hitting the rotors 112 of the LPC 12. By changing the incidence angle of the airflow through the LPC 12, the loading on the rotors 112 thereof can be modified and thus balance, if desired. In other words, the aerodynamic load imposed on the rotors 112 of the LPC 12 can be balanced, as may be required, by modulating the positions of the variable IGVs 50 and/or by splitting the output of the differential gearbox 130 between the RGB 30 and the transmission shaft 32 of the LPC 12. Since the RGB 30 and the LPC 12 are linked through the differential 130, changing the aerodynamic load on the LPC will accordingly change the rotational speed of the LPC rotors 112. Accordingly, when the engine is operating in the cruise engine operating configuration (FIG. 3), the aerodynamic load on the LPC 12 is reduced by closing the IGVs 50 and modifying the incidence angle of the airflow on the LPC rotors 112, which increase the rotational speed of the LPC 12 and, coupled with a slowing of the LPT 20 due to a reduction in power—which may be desirable during cruise flight conditions, will result in a decrease in the rotational speed of the RGB 30 and the engine output shaft 26 driven thereby. In contrast, when the engine 10 is running in the VTOL engine operating configuration (FIG. 2), the IGVs 50 are opened thereby increasing the aerodynamic load on the LPC 12. It is to be understood that the "open" and "closed" positions of the IGV as used herein may not be the fully open and fully closed positions thereof. Accordingly, the substantially open position and the substantially closed position of the IGVs are defined merely as relative terms (i.e. one is more closed than the other, and vice versa).

Referring to FIG. 2, which depicts the engine 10 operating in a full-power VTOL configuration, the engine output shaft 26 driving the aircraft rotor 33, the LPC 12 and the LPT 20 are all operating at approximate 100% rotational speed.

It is to be appreciated that 100% speed as referred to herein is not the maximum possible speed of the rotor and/or engine assembly, but rather the speed of the component at a nominal design speed for takeoff at "full-power" levels. This full-power, nominal design speed for takeoff, configuration may for example be that employed during VTOL flight conditions, however it remains possible that rotational speeds and power levels about this value may still be safely possible.

Referring now to FIG. 3, which depicts the engine 10 operating in a reduced-power cruise configuration, the engine output shaft 26 driving the aircraft rotor 33 is operated at a reduced rotational speed in comparison with the rotational speed when the engine 10 is operating in the VTOL configuration of FIG. 2. In one particular embodiment, the output shaft 26 and thus the aircraft rotor 33 is driven at a speed of between 25% and 100% of the full-power VTOL speed. In a more particular embodiment, the output shaft 26 is driven at a speed of between 25% and 75%, or alternately between 40% and 80% of the full-power VTOL speed, and even more particularly still at a speed of between 40% and 60% (such as but not limited to approximately 50% of the full-power VTOL speed). Accordingly, rotor tip speed of the aircraft rotor(s) can be reduced to below typical rotorcraft hover (e.g. VTOL) levels, which may reduce losses caused by the helical tip Mach No. of the rotor in the cruise configuration, thereby improving efficiency and/or reduce rotor induced noise. As noted above, however, in typical designs such a reducing in aircraft rotor speeds also necessitates a corresponding reduction in LPT speeds. In the present engine 10, however, the output shaft 26 and thus the aircraft rotor driven thereby can be operated at reduced speeds (e.g. 50% of the full-power VTOL rotor speed), while still maintaining a rotational speed of the LPT 20 that is within its most efficient operating range (e.g. between 80% and 100% of its respective nominal design speed for takeoff). This implies, given the differential 130 interconnecting the elements, that the LPC increases in speed above its respective nominal design speed for takeoff in the full-power VTOL configurations. In one particular embodiment, the LPC 12 rotates at a speed of between 80% and 140% of its nominal design speed for takeoff in the full-power VTOL configuration. In a more particular embodiment, the LPC 12 rotates at a speed of at approximately 130% of its nominal design speed for takeoff in the full-power VTOL configuration.

In the example of FIG. 3, therefore, the LPT 20 is operated in this cruise configuration at a speed of approximately 80%, or alternately between 80%-100%, relative to the nominal design speed for takeoff (100%) of the VTOL configuration (FIG. 2), but the engine output shaft 26 and aircraft rotor 33 is operated at a comparatively lower speed (e.g. 50% of its respective nominal design speed for takeoff in the VTOL configuration). This permits the LPT 20 to remain near its design point, or within a preferred speed range for optimum efficiency (e.g. between 80% and 100% of the nominal design speed for takeoff for VTOL). This is possible due to, among other things, the differential 130 which operates to permit the power output from the LPT 20 to be split between the LPC 12 and the RGB 30, and ultimately the engine output shaft 26 driven thereby. The differential 130, and in some embodiments the IGVs 50, accordingly operate together to independently control the rotational speeds of the LPT 20, the LPC 12 and the engine output shaft 26 driving the aircraft rotor, so as to help provide fuel burn savings during cruise flight configurations, permit greater forward flight speed, and/or improve the operating range of the aircraft.

Referring to FIG. 4, the engine 10 may be controlled, in order to switch between the VTOL configuration of FIG. 2 and the cruise configuration of FIG. 3, using an engine control system 60 which may include a controller 62 that is in communication with the engine 10 (and more particularly with, among other things, the IGVs 50 and the differential 130) to control the speed of the output shaft 26 of the engine 10 using, among other things, the pitch of the aircraft rotor/propeller. The engine's control system 60 therefore may include a controller 62 operable and configured to either increase or reduce the speed of the aircraft rotor. If the controller is instructed to reduce the speed of the aircraft rotor, the pitch angle of the propeller/rotor blades is increased, using a propeller governor 64 operably connected to the controller 62, which generates more torque. The propeller governor controls and sets the speed of the propeller/rotor by setting its pitch.

In operation, a governor of the control system tells the rotor of the aircraft to reduce its speed to a reduced speed level for cruise flight configurations, and the engine controller of the control system changes the orientation of the IGVs 50 in the LPC 12 to reduce the aerodynamic load on the LPC 12. This causes the speed of the LPC 12 to increase. As a consequence of the reduced aircraft rotor speed and the increased speed of the LPC 12, the speed of the LPT 20 is also reduced, but not lower than a lower threshold of its range of preferred operational efficiency.

In one particular embodiment, the reduced speed level of the aircraft rotor for cruise flight configurations is between 40% and 80%, and optionally about 50%, of its nominal design speed for takeoff for VTOL flight configurations. In one particular embodiment, the lower threshold of the preferred operational efficiency range of the LPT 20 is about 80% of its nominal design speed for takeoff.

The differential 130 therefore independently couples the LPT 20 with the LPC 12 and the LPT 20 with the output shaft and spool 26, so as to allow a rotational speed difference therebetween. Consequently, during a cruise flight configuration (FIG. 3) when less power is needed, the output shaft 26 and aircraft rotor are allowed to rotate at a relatively greater reduced rotational speed than the speed reduction of the LPT 20, in comparison with their respective nominal design speeds for takeoff. The power and speed is thus split by the differential 130 between the LPC 12 and the RGB 30/output shaft 26. Thus, during cruise configurations, the IGVs 50 can be closed—or at least moved into a more closed (or substantially closed) position to restrict airflow through the LPC 12—thereby reducing the load on the LPC 12 and thus causing it to spin faster. The speed of the LPT 20 is a function of the speeds of the output shaft 26 and the LPC 12. Conversely, during VTOL configurations, the IGVs can be opened—or at least moved into a more open (or substantially open) position, thereby increasing the load on the LPC 12 and causing it to spin more slowly.

This permits, for tilt-rotor VTOL aircraft applications, the aircraft rotor(s) to rotate at a high speed to generate lift in hover or VTOL flight configurations, while still permitting the aircraft rotors to be reduced in rotational speed during cruise flight configurations and/or when transitioning from their VTOL positions to a horizontal orientation for forward flight.

The present gas turbine engine 10 accordingly includes a differential gearbox which couples the low pressure turbine with the low pressure compressor and output spool. The differential gearbox permits a greater rotational speed reduction on aircraft rotor than on low pressure turbine, which allows for greater forward flight speed while keeping the turbine component closer to its design point and provides more efficient operating range. The differential therefore allow for a greater rotational speed reduction on the aircraft rotor than on the low pressure turbine, which may permit greater forward flight speed while keeping the turbine component closer to its design point and/or may provide a more efficient operating range. A method of allowing for greater forward flight speed/improving operating range of a Vertical Takeoff and Landing (VTOL) aircraft during cruise is therefore also provided, using the engine 10, and includes using a differential gearbox coupling the engine's LPT with its LPC and rotor output spool, to permit greater rotational speed reduction of the aircraft rotor during cruise than on the LPT.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine of a vertical takeoff and landing (VTOL) aircraft, the gas turbine engine comprising:
   a low pressure spool including a low pressure turbine shaft operatively connected to at least one turbine, the low pressure turbine shaft rotatable about an engine axis;
   a high pressure spool including at least one high pressure turbine and at least one high pressure compressor operatively connected together by a high pressure shaft and rotatable about the engine axis, the high pressure shaft being independently rotatable relative to the low pressure turbine shaft;
   a low pressure compressor operatively connected to a low pressure compressor shaft that is independently rotatable relative to the high pressure shaft;
   a differential gearbox having an input operatively connected to the low pressure turbine shaft, a first output and a second output, the first output of the differential gearbox operatively connected to the low pressure compressor shaft and the second output of the differential gearbox operatively connected to an output shaft of the gas turbine engine, the differential gearbox permitting the output shaft, the low pressure compressor shaft and the low pressure turbine shaft to rotate at different speeds; and
   a control system having a controller in operative connection with the gas turbine engine, the controller operable to switch the gas turbine engine between a VTOL engine operating configuration and a cruise engine operating configuration, by controlling rotational speeds of the output shaft and the low pressure compressor shaft via the differential gearbox, and wherein, in the cruise engine operating configuration, the controller is operable to control the gas turbine engine to drive the low pressure compressor, via the differential gearbox, at between 80% and 150% of a nominal design speed thereof for takeoff when operating in the VTOL engine operating configuration.

2. The gas turbine engine as defined in claim 1, wherein the low pressure compressor includes a compressor rotor with variable inlet guide vanes.

3. The gas turbine engine as defined in claim 1, wherein the low pressure compressor includes two or more stages each having a compressor rotor, at least one of the two or more stages having a set of variable inlet guide vanes.

4. The gas turbine engine as defined in claim 3, wherein a number of stages, and therefore compressor rotors, of the low pressure compressor is greater than a number of the sets of variable inlet guides vanes.

5. The gas turbine engine as defined in claim 3, wherein at least two of the two or more stages having said variable inlet guide vanes, the variable inlet guide vanes of each of the at least two stages being independently controllable.

6. The gas turbine engine as defined in claim 1, wherein the low pressure compressor includes variable inlet guide vanes, the control system configured to position the variable inlet guide vanes in a substantially open position when the gas turbine engine is operated by the control system in the VTOL engine operating configuration.

7. The gas turbine engine as defined in claim 6, wherein the control system is configured to move the variable inlet guide vanes into a more closed position relative to the substantially open position, when the gas turbine engine is operated by the control system in the cruise engine operating configuration.

8. The gas turbine engine as defined in claim 6, wherein the control system is configured to balance aerodynamic loads on the low pressure compressor by varying positions of the variable inlet guide vanes.

9. The gas turbine engine as defined in claim 1, wherein the control system is configured to use the differential gearbox to vary ratios between the speeds of the output shaft and the low pressure compressor shaft, and/or between the speeds of the output shaft and the low pressure turbine shaft.

10. The gas turbine engine as defined in claim 1, wherein, in the cruise engine operating configuration, the controller is operable to maintain rotational speed of the low power turbine between 80% and 100% of the first rotational speed a nominal design speed therefore for takeoff when operating in the VTOL engine operating configuration.

11. The gas turbine engine as defined in claim 1, wherein the second output of the differential gearbox operatively connected to the output shaft of the gas turbine engine is connected therewith via a reduction gearbox, the reduction gearbox receiving torque input from the first output of the differential and providing a torque output to the output shaft of the gas turbine engine.

12. A gas turbine engine of a vertical takeoff and landing (VTOL) aircraft, the gas turbine engine comprising:
a low pressure spool including a low pressure turbine shaft operatively connected to at least one turbine, the low pressure turbine shaft rotatable about an engine axis;
a high pressure spool including at least one high pressure turbine and at least one high pressure compressor operatively connected together by a high pressure shaft and rotatable about the engine axis, the high pressure shaft being independently rotatable relative to the low pressure turbine shaft;
a low pressure compressor operatively connected to a low pressure compressor shaft that is independently rotatable relative to the high pressure shaft;
a differential gearbox having an input operatively connected to the low pressure turbine shaft, a first output and a second output, the first output of the differential gearbox operatively connected to the low pressure compressor shaft and the second output of the differential gearbox operatively connected to an output shaft of the gas turbine engine, the differential gearbox permitting the output shaft, the low pressure compressor shaft and the low pressure turbine shaft to rotate at different speeds; and
a control system having a controller in operative connection with the gas turbine engine, the controller operable to switch the gas turbine engine between a VTOL engine operating configuration and a cruise engine operating configuration, by controlling rotational speeds of the output shaft and the low pressure compressor shaft via the differential gearbox, the controller being configured to: a) drive the output shaft at a lower speed in the cruise engine operating configuration than in the VTOL engine operating configuration; and b) drive the low pressure compressor shaft at a higher speed in the cruise engine configuration than in the VTOL engine operating configuration.

13. The gas turbine engine as defined in claim 12, wherein the controller is configured such that, in the cruise engine operating configuration, the output shaft is driven at a reduced speed of between 25% and 100% of a speed in the VTOL engine operating configuration, and the low pressure turbine rotates between 80% and 100% of its nominal design speed for takeoff when operating in the VTOL engine operating configuration.

14. The gas turbine engine as defined in claim 13, wherein, in the cruise engine operating configuration, the controller is configured such that the low pressure compressor is driven by the differential gearbox at a speed greater than its nominal design speed for takeoff when operating in the VTOL engine operating configuration.

15. A method of operating a vertical takeoff and landing (VTOL) aircraft having an aircraft rotor operatively connected to a gas turbine engine that includes a low pressure compressor, a high pressure compressor, a high pressure turbine and a low pressure turbine, the method comprising:
during a VTOL flight phase of the aircraft, driving the aircraft rotor at a high-power rotational speed, with the low pressure turbine rotating at a first rotational speed and the low pressure compressor rotating at a second rotational speed; and
during a cruise flight phase of the aircraft driving the aircraft rotor at a low-power rotational speed that is less than the high-power rotational speed by increasing the first rotational speed and decreasing the second rotational speed, while maintaining rotational speed of the low power turbine between 80% and 100% of the first rotational speed, and maintaining rotational speed of the low pressure compressor between 80% and 150% of the first rotational speed.

16. A method of operating a vertical takeoff and landing (VTOL) aircraft having an aircraft rotor operatively connected to a gas turbine engine that includes a low pressure compressor, a high pressure compressor, a high pressure turbine and a low pressure turbine, the method comprising:
during a VTOL flight phase of the aircraft, driving the aircraft rotor at a high-power rotational speed, with the low pressure turbine rotating at a first rotational speed and the low pressure compressor rotating at a second rotational speed;
during a cruise flight phase of the aircraft, driving the aircraft rotor at a low-power rotational speed that is less than the high-power rotational speed by increasing the first rotational speed and decreasing the second rotational speed, including using a differential gearbox to drive the aircraft rotor at the low-power rotation speed while maintaining a rotational speed of the low power turbine above 80% of the first rotational speed.

17. A gas turbine engine for a vertical takeoff and landing (VTOL) aircraft having an aircraft rotor, the gas turbine engine comprising:
a low pressure turbine shaft connected to at least one turbine for driving the low pressure turbine shaft about an engine axis, and a low pressure compressor operatively connected to a low pressure compressor shaft independently rotatable relative to the low pressure the power turbine shaft; and
means for operating the gas turbine engine in either a VTOL engine operating configuration or a cruise engine operating configuration, wherein in the VTOL engine operating configuration the low pressure turbine and the low pressure compressor are operated at their respective nominal design speed for takeoff, and in the cruise engine operating configuration, the low pressure turbine rotates between 80% and 100% of its nominal design speed for takeoff and the low pressure compressor is driven to rotate at between 80% and 150% of its nominal design speed for takeoff.

\* \* \* \* \*